US008307955B2

(12) United States Patent
Sommerfeld et al.

(10) Patent No.: US 8,307,955 B2

(45) Date of Patent: *Nov. 13, 2012

(54) MECHANICAL RELEASE OF RELEASE HOLDING MECHANISM FOR HAND BRAKE

(75) Inventors: Howard R. Sommerfeld, Oak Forest, IL (US); Scott Natschke, Chicago, IL (US)

(73) Assignee: Wabtec Holding Corp., Wilmerding, PA (US)

( * ) Notice: Subject to any disclaimer, the term of this patent is extended or adjusted under 35 U.S.C. 154(b) by 894 days.

This patent is subject to a terminal disclaimer.

(21) Appl. No.: 11/629,670

(22) PCT Filed: Jun. 21, 2005

(86) PCT No.: PCT/US2005/022231

§ 371 (c)(1),
(2), (4) Date: Jul. 13, 2007

(87) PCT Pub. No.: WO2006/002303

PCT Pub. Date: Jan. 5, 2006

(65) Prior Publication Data

US 2008/0110702 A1 May 15, 2008

(51) Int. Cl.
*B61H 13/00* (2006.01)
*F16D 65/00* (2006.01)

(52) U.S. Cl. ........... 188/33; 188/82.1; 188/107; 74/505; 74/552

(58) Field of Classification Search .................... 188/33, 188/34, 107, 265, 82.1, 82.3; 74/505-507, 74/527, 529, 531, 552, 556; 192/95, 89.21, 192/114 R See application file for complete search history.

(56) References Cited

U.S. PATENT DOCUMENTS

| | | | | |
|---|---|---|---|---|
| 3,010,543 | A * | 11/1961 | Pear, Jr. | 188/71.5 |
| 3,988,944 | A | 11/1976 | Klasing et al. | |
| 4,282,771 | A * | 8/1981 | Grube | 74/505 |
| 4,368,648 | A | 1/1983 | Housman et al. | |
| 5,127,283 | A * | 7/1992 | O'Brien et al. | 74/505 |
| 6,033,372 | A * | 3/2000 | Tarbet et al. | 601/123 |
| 6,325,465 | B1 * | 12/2001 | Sommerfeld et al. | 303/13 |
| 6,345,702 | B1 * | 2/2002 | Tessitore | 188/79.52 |
| 6,394,233 | B1 * | 5/2002 | Kanjo et al. | 188/1.11 R |
| 7,021,430 | B2 * | 4/2006 | Ring et al. | 188/33 |
| 7,093,694 | B2 * | 8/2006 | Brandt et al. | 188/1.11 R |
| 7,487,695 | B2 * | 2/2009 | Sommerfeld et al. | 74/506 |
| 2005/0279184 | A1 | 12/2005 | Sommerfeld et al. | |
| 2008/0134826 | A1 * | 6/2008 | Natschke et al. | 74/480 R |

FOREIGN PATENT DOCUMENTS

| | | |
|---|---|---|
| AU | 441976 | 5/1973 |

* cited by examiner

*Primary Examiner* — Melody Burch

(74) *Attorney, Agent, or Firm* — The Webb Law Firm

(57) ABSTRACT

A hand brake mechanism having a mechanism to disengage a release lever disposed within a clutch and release assembly at the beginning of the brake application cycle. This mechanism includes a holding pawl having a force transmitting member which cooperates with a force receiving member disposed within the release lever to effect rotational motion onto the release lever at the beginning of the brake application cycle. At least one spring is provided to substantially complete rotational motion of the release lever.

2 Claims, 5 Drawing Sheets

MECHANICAL RELEASE OF RELEASE HOLDING MECHANISM FOR HAND BRAKE

CROSS-REFERENCES TO CO-PENDING APPLICATION

This application and U.S. Ser. No. 10/873,967, now U.S. Pat. No. 7,487,695, entitled "Release Holding Mechanism for ASR Hand Brake, were filed concurrently and are assigned to the same assignee. The teachings of the co-pending application are incorporated herein by reference.

FIELD OF THE INVENTION

The present invention relates, in general, to hand brake assemblies for use on railway type vehicles and, more particularly, this invention relates to a hand brake assembly equipped with a quick release mechanism.

BACKGROUND OF THE INVENTION

Railway car hand brake mechanisms are well known in the railway art. They usually include a relatively large, rotatable hand wheel disposed in a substantially vertical plane and mounted on a shaft which, through a gear train, can rotate a chain drum in order to wind up a chain that is secured at its end remote from the chain drum to the brake rigging of the railway car. As the hand wheel is rotated in one direction, the brakes are applied and rotation of the hand wheel shaft in the opposite direction is prevented by a pawl which engages a detent wheel on the hand wheel shaft.

These hand brake mechanisms further include a clutch mechanism for facilitating gradual release of the brake. When the hand wheel is rotated clockwise (as viewed from the front of the unit), such rotation is transmitted directly through a drive shaft, a pinion, a gear, and a winding drum to take up slack of a chain connected to the brake rigging. When resistance is offered by the chain to further rotation of the hand wheel, such resistance, acting back through the drum, the gear, and pinion, causes a nut to be advanced on a threaded portion of the drive shaft to move against a ratchet member which is clamped between respective friction surfaces on the nut and on the drive shaft, thus causing the drive shaft, ratchet, and the nut to rotate as a unit. A pawl prevents rotation of the ratchet in the opposite direction.

The hand wheel torque is increased until a state of static equilibrium is reached, or at the point at which the brakes are fully applied, whereupon rotation of the hand wheel is terminated, and the clamped ratchet, by means of the holding pawl, prevents the chain from unwinding.

The clutch mechanism also provides for quick release of the brakes by operating a release handle which effects disengagement of the normally engaged clutch and thereby allows free rotation of the pinion and gear to release the chain load while the nut and ratchet are held stationary by the holding pawl. The brakes may be released by disengaging the pawl from the detent wheel but this causes rapid rotation of the hand wheel and the gears of the gear train.

To avoid rapid rotation of the hand wheel, hand brake mechanisms have been devised which are known as "quick release" mechanisms. U.S. Pat. No. 4,368,648 titled Hand Brake for Railroad Car teaches such a hand brake having a quick release mechanism.

Such quick release mechanism includes a releasable connecting means between the hand wheel shaft and the gear train. When the connecting means is released, the gears of the gear train rotate rapidly, without constraint by the pawl and detent wheel, but the hand wheel remains stationary. The teachings of U.S. Pat. No. 4,368,648 are hereby incorporated into present application by reference thereto.

The co-pending U.S. patent application filed concurrently herewith and having Ser. No. 10/873,967, now U.S. Pat. No. 7,487,695, and entitled "Release Holding Mechanism for ASR Hand Brake" teaches a release lever being positively retained by the spring holding means. In order to apply brakes, the release lever must be repositioned so as to allow brake application. As it can be seen from the above discussion there is a need for means to reposition such release lever to a starting position for brake application.

SUMMARY OF THE INVENTION

In a handbrake mechanism for a railway car, a hand wheel is used to rotate a gear wheel to apply the brakes. Such handbrake having a housing with a back wall and a front wall, with a chain winding drum and a main gear wheel rotatably mounted on a drum shaft. The hand wheel having a shaft rotatably mounted on the housing having a bearing section at a first end and a hand wheel receiving section on a second end external to such housing. A ratchet wheel is mounted on the hand wheel shaft and rotatable with the hand wheel shaft intermediate the first and second ends thereof. A holding pawl in the housing cooperates with the ratchet wheel so as to prevent reverse rotation thereof. Additionally, a freely rotatable pinion on such hand wheel shaft engages the main gear wheel. The pinion has a radially extending flange cooperating therewith. A quick release mechanism cooperates with the holding pawl to allow reverse rotation of the ratchet wheel for releasing the chain. The holding pawl comprises a force transmitting means which cooperates with a force receiving means disposed within such release lever to effect rotational motion onto the release lever at the beginning of a brake application cycle. At least one spring means is provided to substantially complete rotational motion of the release lever.

OBJECTS OF THE INVENTION

It is therefore one of the primary objects of the present invention to provide a hand brake having a means to return the release lever to a starting position in order to allow a brake application.

It is an additional object of the present invention to provide a hand brake means to return a release lever to a starting position to allow a brake application, which is easily convertible for use with the presently disclosed hand brake.

Although a number of objects and advantages of the present invention have been described in some detail above, various additional objects and advantages of the hand brake mechanism of the present invention will become more readily apparent to those persons who are skilled in the relevant art from the following more detailed description of the invention, particularly, when such detailed description of the invention is taken in conjunction with both the attached drawing figures and with the appended claims.

DETAILED DESCRIPTION OF THE INVENTION

Figure 1:
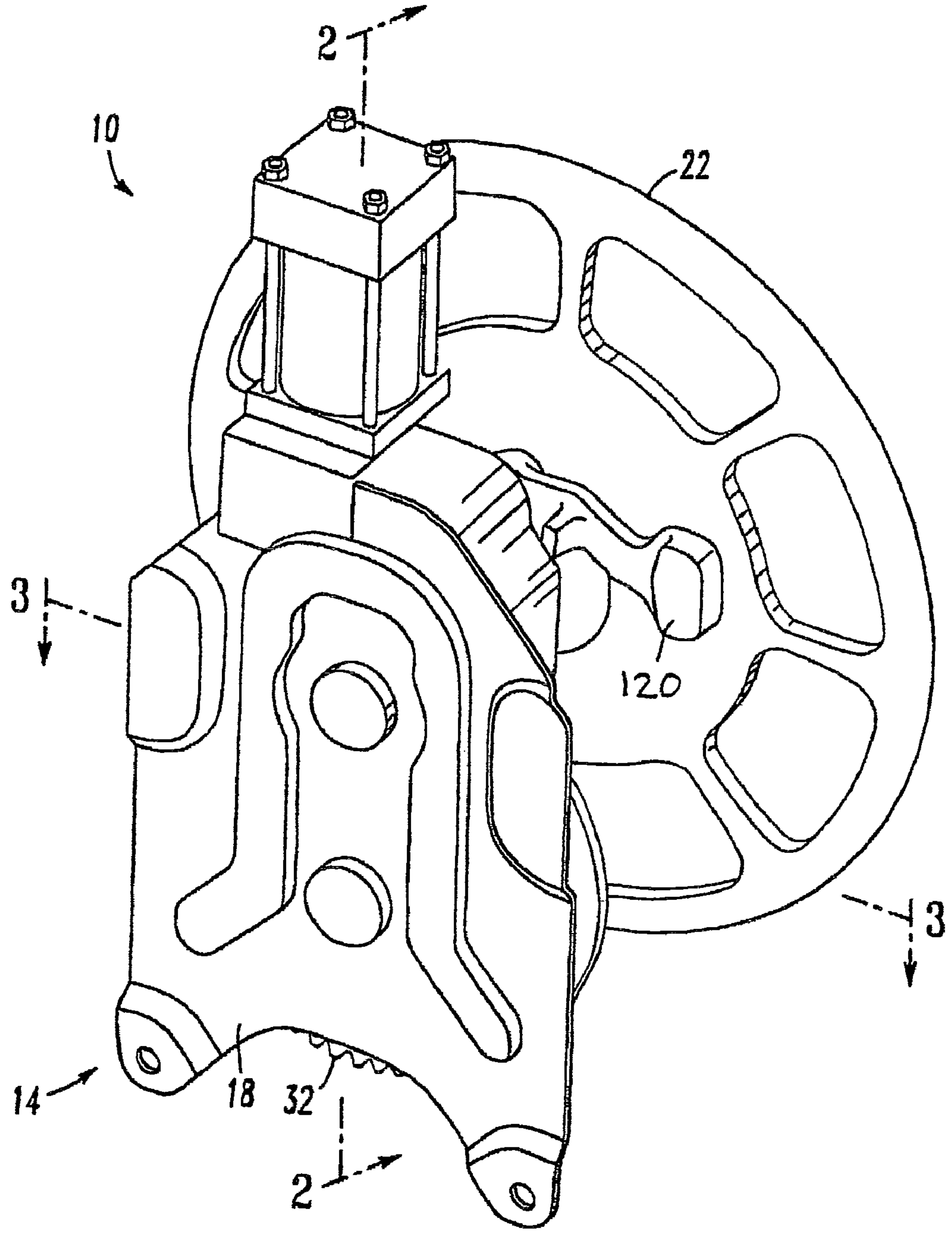
FIG. 1 is a perspective view of a hand brake assembly of a presently preferred embodiment of the invention.

The following background information is provided to assist the reader to understand the environment in which the invention will typically be used. The terms used herein are not intended to be limited to any particular narrow interpretation unless specifically stated otherwise in this document.

Prior to proceeding to the more detailed description of the various embodiments of the present invention, for the sake of clarity and understanding of such invention, it should be noted that identical components having identical functions have been identified with identical reference numerals throughout each of the figures illustrated herein.

Figure 2:
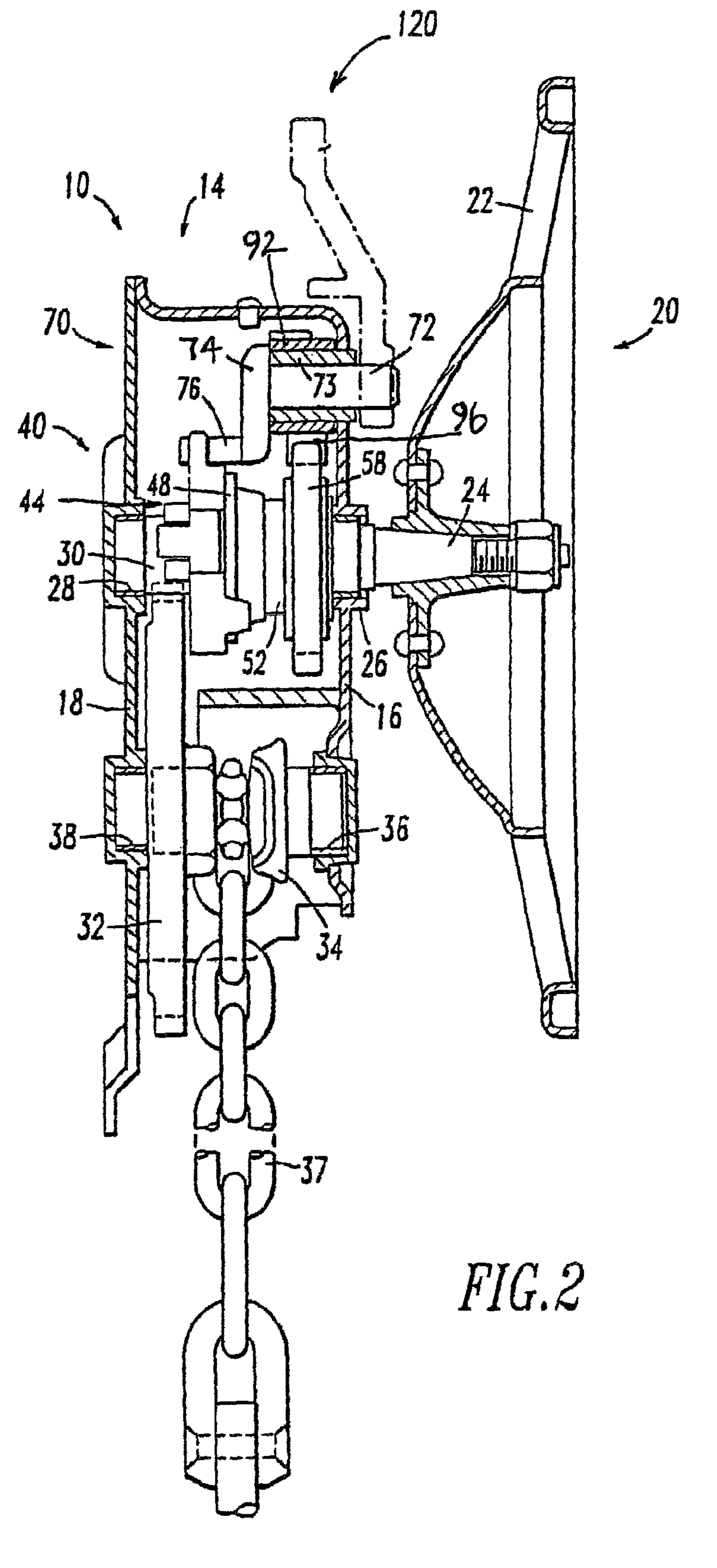
FIG. 2 is a cross-sectional view of the hand brake assembly, taken along the lines 2-2 of FIG. 1 showing a chain component.

A hand brake, generally designated 10, for railroad cars embodying the invention, as shown in FIGS. 1 and 2, comprises a housing, generally designated 14, having a front plate 16 and a back plate 18. A driving mechanism, generally designated 20, is disposed in the upper portion of housing 14, such driving mechanism comprising a hand wheel 22 secured to a drive shaft 24, the drive shaft 24 being journaled for rotation in bearings 26 and 28 secured in front plate 16 and back plate 18, respectively.

The drive shaft 24 has secured thereon, for rotation therewith, at the end adjacent bearing 28, a pinion 30 which engages with a gear 32 for rotating a chain drum 34 journaled for rotation in bearings 36 and 38 secured on front plate 16 and back plate 18, respectively, in the lower portion of housing 14. Chain drum 34 is engageable with alternate links of a chain 37 for taking-up the chain.

Figure 3:
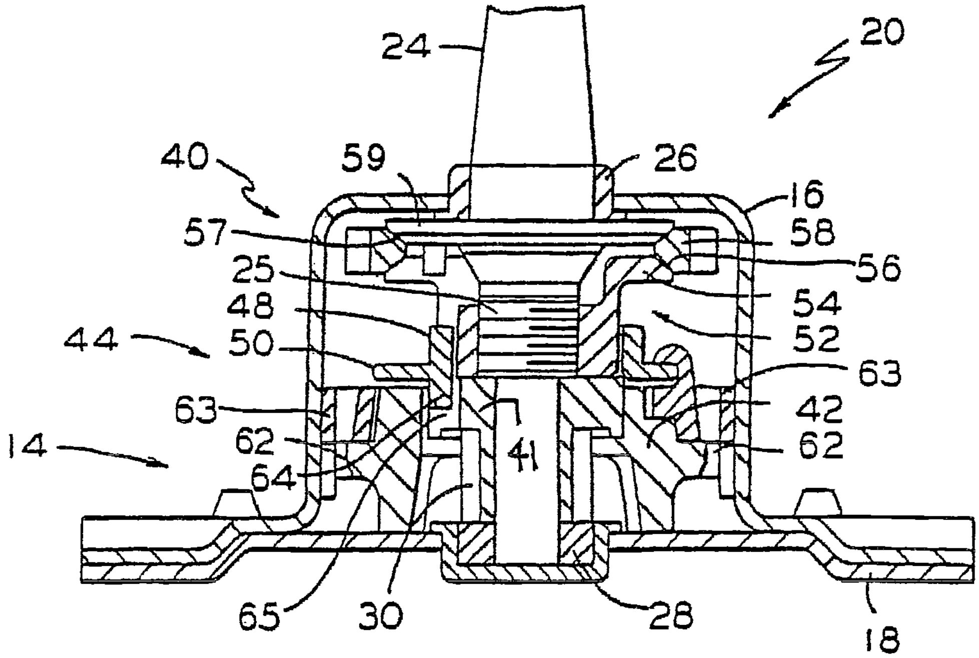
FIG. 3 is a cross-sectional view of the hand brake assembly, taken along the lines 3-3 of FIG. 1 showing a clutch and release mechanism.

Also disposed in the upper portion of housing 14 and associated with the driving mechanism, is a clutch and quick release mechanism, generally designated 40, which may best be seen in FIG. 3. The clutch and quick release mechanism 40 comprises an annular stationary cam member 42 which is restrained from both axial and rotational movement, and a movable cam member, generally designated 44, rotatably disposed concentrically within the stationary cam 42, the movable cam 44 being rotatable relative to the stationary cam member 42 by means of complementary fast pitch threads (not shown) formed thereon.

An internally splined annular clutch collar 48 is provided with an annular flange 50 and concentrically surrounds the drive shaft 24, the collar 48 engaging with an externally splined nut, generally designated 52, attached to threaded portion 25 of such shaft 24. Nut 52 has a flange 54 which has an annular friction surface 56 for making abutting contact with one side of a ratchet wheel 58, the other side of the ratchet wheel 58 being abuttable with a friction surface 57 of a friction plate 59 concentrically secured to shaft 24 adjacent bearing 26.

Figure 4:
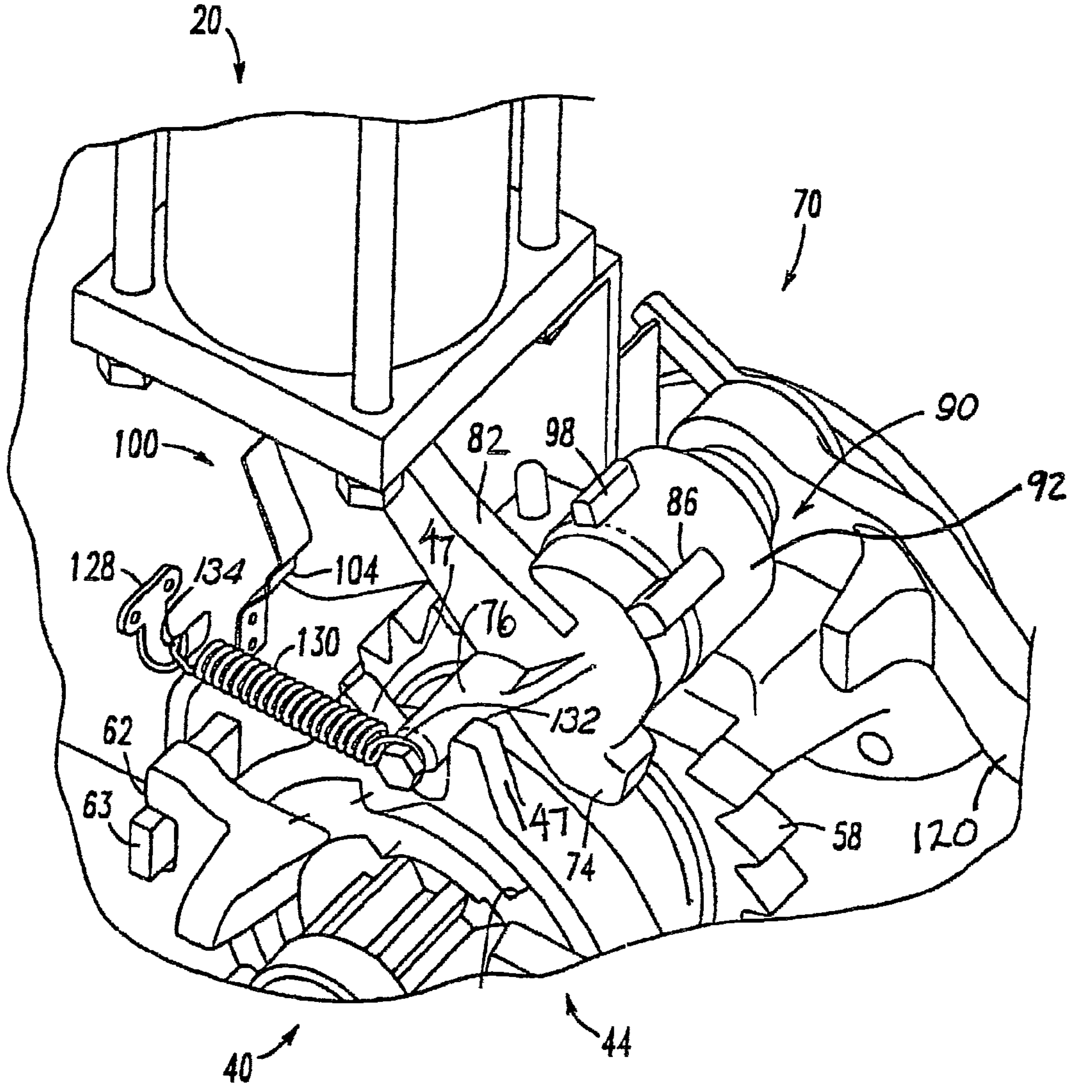
FIG. 4 is a cut-away perspective view of a hand brake assembly of the present invention, particularly showing the holding pawl of the present invention when the hand brake is in a released and hold position.
Figure 5:
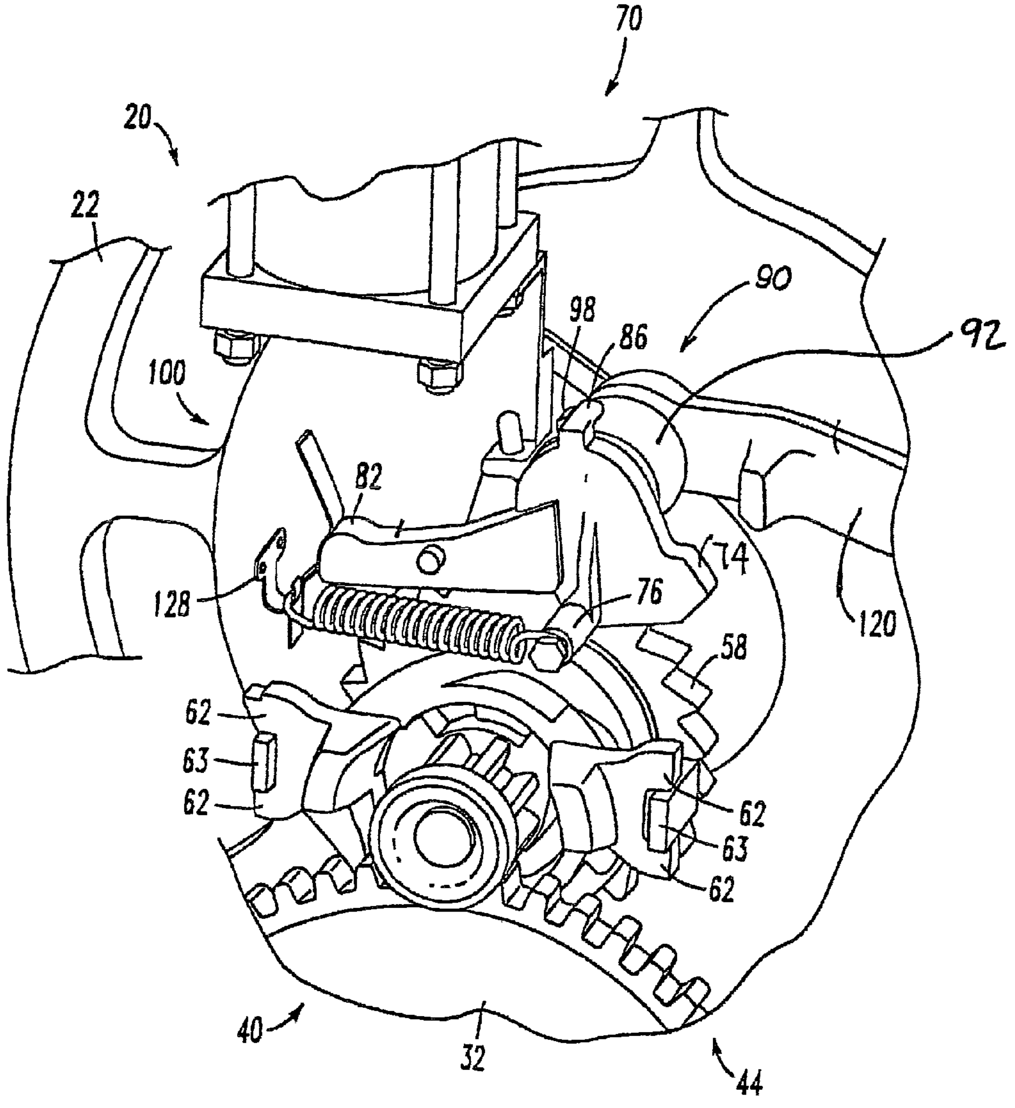
FIG. 5 is a cut-away perspective view of a hand brake assembly of the present invention, particularly showing the holding pawl of the present invention in the brake applied position.

A clutch and quick release mechanism 40 includes a release lever, generally designated 70, best seen in FIGS. 4 and 5, having a shaft 72 journaled in a release shaft bushing 73 perpendicularly secured in housing front plate 16 above the driving mechanism 20. A release handle, generally designated 120, engages an external end of release shaft 72 while the other end of such release shaft 72 is provided with a main portion 74, thereby preventing axial displacement of release lever 70. A holding pawl, generally designated 90, having a mounting cavity (not shown) disposed within locating portion 92 is rotatably mounted on release shaft bushing 73. The ratchet engaging portion 96 of holding pawl 90 engages ratchet wheel 58 and is free to ratchet thereon upon rotation of such ratchet wheel 58 in a counter-clockwise direction, as viewed in FIG. 1. A force transmitting tab portion 98 of holding pawl 90 cooperates with a force receiving tab portion 86 of release lever 70 and engages the force receiving tab portion 86 during a brake application cycle. At least one detent retaining means 100, engages a detent portion 82 of the release lever 70 with the brake in the released and hold condition.

At least one spring means, generally designated 130, has a first attachment portion 132 and a second attachment portion 134. The first attachment portion 132 engages with the release lever portion 78 attached to the pin portion 76 at one end and the second attachment portion 134 engages a mounting hook 128 attached to the housing 14 at the distal end. In the preferred embodiment such at least one spring means 130 is a well known compression spring.

In operation, in order to apply the brakes, hand wheel 22 is rotated counter-clockwise, as viewed in FIG. 1, such rotation being transmitted through drive shaft 24, and pinion 30 to cause rotation of gear 32 in a clockwise rotation and thereby take-up slack of chain 37. Until such time that tension starts to build up in chain 37, shaft 24, pinion 30, nut 52, and clutch collar 48 all rotate as a unit during rotation of hand wheel 22. When tension begins to build up in the chain 37, such tension is reflected in gear 32 and transmitted back through pinion 30 and radially extending flange 41 cooperating therewith (see FIG. 3) to clutch collar 48.

A resistance to rotation by clutch collar 48, which is splined to nut 52, causes nut 52 to advance on threads 25 and thereby clamp ratchet member 58 between friction surfaces 56 and 57. With ratchet 58 so clamped, continued rotation of wheel 22 causes drive shaft 24, the ratchet member 58, and nut 52 (along with friction plates 59) to rotate as a single unit until the desired tension is attained on chain 37, while holding pawl 90 ratchets on such ratchet member 58. The ratchet engaging portion 96 of the holding pawl 90 moves in an upward direction from the root of the ratchet tooth to its external surface. Force transmitting tab portion 98 of holding pawl 90 engages the force receiving tab portion 86 of release lever 70 effecting rotational movement of such release lever 70 in a clockwise direction as viewed in FIGS. 4 and 5. Such rotational movement causes disengagement of the detent portion 82 of the release lever 70 from the detent retaining portion 104 of the leaf spring 100. Furthermore, an extension spring 130 applies an additional force onto release lever 70 effecting completion of the release lever 70 rotational movement and disengagement from the leaf spring 100.

Subsequent engagement of pin portion 76 with first fork portion 47 of movable cam 44, causes counter-clockwise rotation of the movable cam 44. As was hereinbefore noted, stationary cam 42 and movable cam 44 are provided with complementary fast-pitch threads 43, so that as movable cam 44 rotates counter-clockwise, it moves axially outwardly of such stationary cam 42, in a downward direction as viewed in FIG. 3, and carries with it clutch collar 48 by engagement of flange 50 thereof. A groove (not shown) in movable cam 44 serves to constrain the collar flange 50 from relative axial and lateral movement with respect to movable cam 44 but allows free-clutch collar 48 rotation. Stationary cam 42 is restrained against both rotational and axial movement by engagement of lugs 62 formed on the periphery thereof and engaged in respective T-shaped elements 63 fixed to the inside surface of housing 14 (see FIG. 3). Thus, downward axial movement of movable cam 44 causes axial engagement of external splines 64 formed on clutch collar 48 from internal splines 65 formed on pinion 30, thereby constraining the rotation of the pinion 30 and gear 32 for applying the load on chain 37, while drive shaft 24, nut 52, collar 48, and ratchet 58 are allowed to rotate freely. The continued rotation of the hand brake wheel 22 can now apply and hold the required load. When desired tension has been achieved on chain 37, rotation or application of torque on wheel 22 is terminated, and the holding pawl 90 engaged on clamped ratchet member 58 prevents the chain from unwinding, since the pawl permits only counter-clockwise rotation of such ratchet member 58.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. A handbrake mechanism for a railway car, where a hand wheel is used to rotate a gear wheel to apply brakes, comprising:

a housing with a back wall and a front wall, with a chain winding drum and said gear wheel rotatably mounted on said housing, a hand wheel shaft rotatably mounted on the housing, said hand wheel fixed on an end of said hand wheel shaft external to the housing, a ratchet wheel rotatable with the hand wheel shaft intermediate the first and second ends thereof, a freely rotatable pinion on the hand wheel shaft and engaging the gear wheel, the pinion having a radially extending flange cooperating therewith, a disengageable driving connection between the flange and the ratchet wheel;

a quick release mechanism which cooperates with a holding pawl to allow reverse rotation of the ratchet wheel for releasing the chain, a motion enabling mechanism to dispose a release lever into brake application starting position, the release lever having a shaft portion, wherein the motion enabling mechanism comprises:

said holding pawl which cooperates with the ratchet wheel so as to prevent reverse rotation thereof, and having a locating portion rotatably mounted over the release lever;

a ratchet engaging portion of the holding pawl configured to engage a ratchet tooth of the ratchet wheel constraining the rotational movement of the ratchet wheel;

a force transmitting portion of the holding pawl for engagement with a force receiving portion of the release lever;

an outwardly extending substantially cylindrical pin portion of the release lever extending away from the shaft portion for engagement with a first fork portion of a movable cam for effecting rotational motion of the movable cam;

at least one spring member for substantially rotating the release lever into brake application position;

an attachment portion of the release lever located substantially adjacent the substantially cylindrical pin portion for engagement with the at least one spring member;

an outwardly extending lever arm portion of the release lever substantially perpendicular to the shaft portion of the release lever;

a detent disposed within the lever arm portion for engagement with a corresponding detent leaf spring fixed within the handbrake housing; and a release handle engaging an external end of the shaft portion of the release lever for enabling rotation of the release lever upon movement of the release handle.

2. The handbrake mechanism in claim 1, wherein the at least one spring member is an extension spring.

* * * * *